United States Patent
Clarke

(10) Patent No.: US 6,220,802 B1
(45) Date of Patent: Apr. 24, 2001

(54) APPARATUS FOR SPREADING A BOLT LOAD WITH IMPROVED HOLDING CAPACITY

(76) Inventor: Ronald C. Clarke, 328 W. Georgia, Phoenix, AZ (US) 85013

( * ) Notice: Subject to any disclaimer, the term of this patent is extended or adjusted under 35 U.S.C. 154(b) by 0 days.

(21) Appl. No.: 09/492,056

(22) Filed: Jan. 27, 2000

Related U.S. Application Data

(62) Division of application No. 08/911,222, filed on Aug. 15, 1997, now Pat. No. 6,048,150.
(60) Provisional application No. 60/026,259, filed on Sep. 6, 1996.

(51) Int. Cl.$^7$ ............................ F16B 13/06; F16B 23/00; F16B 35/06
(52) U.S. Cl. ............................ 411/63; 411/71; 411/383; 411/396; 411/399
(58) Field of Search ...................... 411/63–68, 71, 411/72, 160, 161, 383, 396, 354, 477, 478, 399

(56) References Cited

U.S. PATENT DOCUMENTS

| | | |
|---|---|---|
| 378,857 | 2/1888 | Woodford . |
| 575,282 * | 1/1897 | Cook ....................................... 411/71 |
| 1,185,402 * | 5/1916 | Hopkins ............................... 411/354 |
| 1,432,243 | 10/1922 | Harris . |
| 1,894,708 | 1/1933 | Sardeson . |
| 2,037,586 | 4/1936 | Olson . |
| 2,787,931 * | 4/1957 | McCage .............................. 411/67 X |
| 2,942,267 * | 6/1960 | Cusumano ......................... 411/478 X |
| 3,077,218 * | 2/1963 | Ziegler .............................. 411/161 X |
| 3,124,030 * | 3/1964 | Strand ..................................... 411/67 |
| 3,241,423 | 3/1966 | Davis . |
| 3,255,797 | 6/1966 | Attwood . |
| 3,298,270 | 1/1967 | Launay . |
| 3,640,326 | 2/1972 | Brown . |
| 4,295,766 | 10/1981 | Shaw . |
| 4,473,332 | 9/1984 | Sturdy . |
| 4,482,277 * | 11/1984 | Schieter .............................. 411/63 X |
| 5,090,853 * | 2/1992 | Madsen ............................... 411/354 |

* cited by examiner

*Primary Examiner*—Neill Wilson
(74) *Attorney, Agent, or Firm*—Donald J. Lisa

(57) ABSTRACT

A forged, integral bolt (20) has a head, a tapered neck (22), a shank, and a plurality of plastically deformable, raised, contact surface portions (31) uniformly positioned adjacent the neck and extending axially and radially of the bolt for spreading a load applied to the bolt. Each raised portion has a base portion contiguous the neck, and an elongated, V-shaped, ridge portion raised above the base which is constructed to contact and fay with a congruent wall portion of a bolt bore (12) in a support structure. The bolt may have various shapes. (FIGS. 1–3, 10–23). The ridges may extend up onto the sides of the head. (FIG. 9). The ridge portions and base portions may be integrally forged as a pair of symmetrical, self-aligning, inserts (40) separate from, but mating with, opposite sides of the neck when a load is applied to the bolt. A doughnut-shaped, repair washer (50) for sealing enlarged holes has a plurality of teeth (53) integral with a flat or curved bottom major surface for gripping a surface which is to be sealed and grooves (51,54) which cooperate with the bolt and a nut (23) to simultaneously seal the bore (52) at the top and bottom surfaces.

14 Claims, 17 Drawing Sheets

APPARATUS FOR SPREADING A BOLT LOAD WITH IMPROVED HOLDING CAPACITY

CROSS-REFERENCES TO RELATED APPLICATIONS

This application is a Division of application Ser. No. 08/911,222 filed Aug. 15, 1997, now U.S. Pat. No. 6,048, 150.

STATEMENT REGARDING FEDERALLY SPONSORED RESEARCH OR DEVELOPMENT

NOT APPLICABLE

BACKGROUND OF THE INVENTION

1. Field of the Invention

This invention relates generally to spreading the clamping load of a bolt which holds an inner liner to an outer shell used in ore milling operations, sealing the shell so that the wet ore slurry in the inner lining does not leak out of the shell through the mounting holes, and repairing enlarged mounting holes which go through the liner and shell to re-establish the ability of the bolt to maintain its designed and desired preload.

2. Description of the Related Art a. Prior Mill Liner Bolting Techniques and Problems Because of individual geometry, the head shape of a conventional tapered or spherical head, counter sunk mill liner bolt, presents a poor load bearing contact with the liner and its mating surface. This condition is due primarily to clearance and manufacturing tolerances between the liner, which is cast, and the radiused, tapered, load bearing area of the bolt, which is forged. This poor load area contact always causes early embedment with subsequent loss of bolt clamp load soon after assembly. It requires repeated, expensive mill shut downs, for bolt tightening, before an adequate surface contact can be formed to support the required bolt clamp load. In a majority of instances, bolts never establish enough surface area contact to stay tight and have to be periodically tightened through the life of the liners. Often, loose bolts fatigue and break with expensive consequences if the liners fall out.

While it is known to provide round headed bolts with a plurality of hard metal protrusions of various types, i.e., wings, keys, or fins, formed along the neck and shank of the bolt which embed themselves in the softer work piece to prevent the bolt from turning when a load is applied to the bolt, such structures are unnecessary when a non-round bolt head is supported in a non-round recess and, moreover, will not work in the environment of the present invention where the work piece, i.e., the mill liner, is made of harder steel than the bolt of the fastener.

Accordingly, it is an object of the present invention to provide improved bolt tightening features and processes which provide improved mating surfaces and preload holding ability which overcomes the problems of the prior art.

Moreover, running with loose bolts is also the cause of bolt holes in the mill shell becoming enlarged, which encourages further loosening and leaking problems eventually leading to expensive repair. Typically, the bolt holes in the liners are cast approximately ⅛" larger, all around the bolt head, for a standard 1½" liner bolt. FIG. 3 shows how inadequately the bolt load surface mates with the liner in a horizontal (radial) plane. FIGS. 1, 2 show loss of vertical (axial) contact face with small neck angle differences.

Accordingly, it is an object of the present invention to provide improved bolt tightening mechanisms which prevent loosening and enlargement of the holes through which the bolt passes thereby overcoming the problems of the prior art.

b. Prior Liner Bolt Sealing Problem

Prior sealing systems used with liner bolts are designed to give good sealing characteristics, but in doing so, sacrifice jointing efficiency. Typically rubber is introduced between the joint surfaces so that a hard joint, i.e., metal-to-metal, is never attained. This condition then becomes a gasketed joint and will never hold bolt preloads adequately.

While it is known to provide a repair washer with a metal-to-metal contact using a two- or three-piece metal and rubber washer combination atop a repair washer to effect an outboard seal at the outer circumference of the bolt of the fastener and the outboard end of the central bore of the repair washer, such structure ignores the further need for a simultaneous metal-to-metal contact with a resilient member beneath the repair washer to effect an inboard seal at the inborad end of the central bore of the repair washer.

Accordingly, it is an object of the present invention to provide an improved sealing system without sacrificing joint efficiency by providing metal-to-metal contact with simultaneous adequate sealing thereby overcoming the problems of the prior art.

BRIEF SUMMARY OF THE INVENTION

Set forth below is a brief summary of the invention in order to achieve the forgoing and other benefits and advantages in accordance with the purposes of the present invention as embodied and broadly described herein.

A first aspect of the invention is a bolt including a head of predetermined shape, a shank, a neck integral with the head and shank, and a plurality of raised contact surface portions uniformly positioned adjacent the neck and constructed and configured for spreading an applied bolt load.

Another feature of this aspect of the invention is the raised contact surface portions include a base portion contiguous the neck, and a ridge portion raised above the base portion and constructed and configured to contact a congruent wall portion of a bolt bore in a support structure.

Still other features of this aspect of the invention include the bolt is a forged bolt, the head shape may be round, elliptical, square, oblong, spherical, or rectangular, and has an axially extending portion of predetermined thickness having a constant circumference, and a tapered neck portion between the head and shank.

Still other features of this aspect of the invention include the neck having a circumference either intermediate the circumferences of the head and shank or greater than both said circumferences.

Another feature of this aspect of the invention is the raised contact surface portions are elongated V-shaped ridges raised above the base portion and are forged integrally with the neck.

Still other features of this aspect of the invention include the raised portions are symmetrically placed relative to the neck, extend substantially an entire length of the neck, may also extend substantially along an entire length of the head, extend axially and radially relative to the longitudinal axis of the bolt, and are deformable and fay to an adjacent bore wall portion whereby when a load is applied to the bolt the load is spread more uniformly over a surface of the neck.

A second aspect of the invention is an insert including a base portion having a width, a length and a thickness, and a plurality of surface contact portions raised above and extending along a length of the base portion.

In this aspect of the invention the plurality of surface contact portions are short relative to a width of the insert, are coterminous with a length of the base portion, and are formed as parallel, symmetrically placed, V-shaped ridges, the height and width of which vary relative to each other according to the amount of a clearance of an adjacent wall portion of a bore hole in a support structure.

A further feature of this aspect of the invention is the insert has a flat shape in one stage of its production and an arcuate shape in its final form which is self-aligning relative to the neck of the bolt when a load is applied to the bolt whereby the load is spread onto the raised contact surfaces.

A third aspect of the present invention is a repair washer for enlarged holes including a shaped body having a top major surface and a bottom major surface and a central bore therethrough, an annular groove in the top major surface constructed and configured to receive an o-ring seal, an annular groove in the bottom major surface constructed and configured to receive an o-ring seal, and a plurality of teeth integral with the bottom major surface constructed and configured for gripping a surface which is to be sealed.

In this aspect of the invention the annular groove in the top major surface is located near the central bore and is constructed and configured to cooperate with a bolt through the central bore and through an overlying fastener to seal the central bore at the top surface, while the annular groove in the bottom major surface is located near the periphery of the bottom major surface and is constructed and configured to cooperate with the bolt through the central bore and through the fastener overlying the top major surface to simultaneously seal the central bore at the bottom surface.

Other features of this aspect of the invention include the teeth are serrated and are constructed and configured to prevent movement and subsequent loosening of the washer while the top and bottom seals are effected when the washer is tightly secured to the sealed surface by an overlying fastener, the bottom major surface portion may be either flat or curved to cooperate with the curved surface which is to be sealed, and the bottom major surface is a load surface and the annular groove therein is constructed and configured to effect a bottom seal on the periphery of the load surface.

BRIEF DESCRIPTION OF THE SEVERAL VIEWS OF THE DRAWINGS

FIG. 14 is a perspective view similar to FIG. 9 and

FIG. 15 is a sectional view taken along the line 15—15 of FIG. 14 while

FIG. 16 is an end view of FIG. 14 showing an alternative square head and round neck shape of the bolt of the present invention.

FIG. 28 shows a serrated load area 53 to prevent movement and subsequent loosening and a special o-ring sealing groove 51 to seal on outside of load area.

having a concave bottom face to match shell 1 curvature, holes for socket screws to clamp plate to shell, and, in a top view, a Valley Forge™ two piece sealing system around liner bolt 20 and under nut 23.

Figure 30:
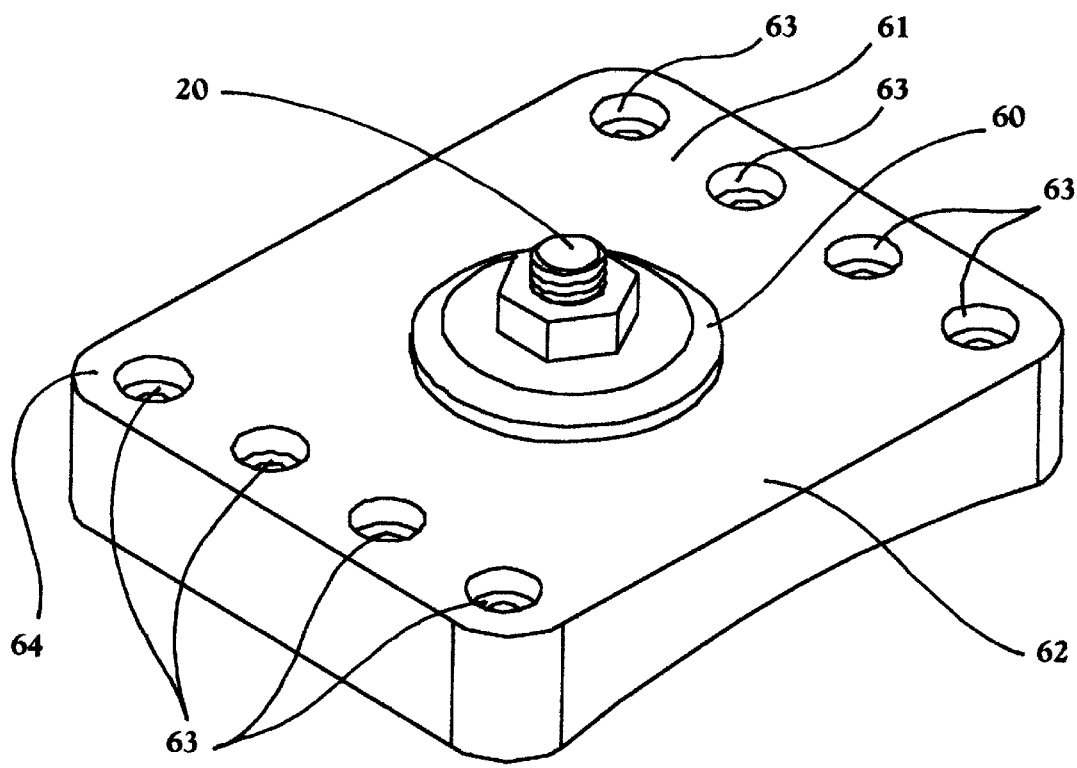
FIG. 30 is a perspective view of a special repair plate of the present invention also showing an additional embodiment of the improved repair washer of the present invention. This drawing shows a special repair washer (rectangular)
Figure 31:
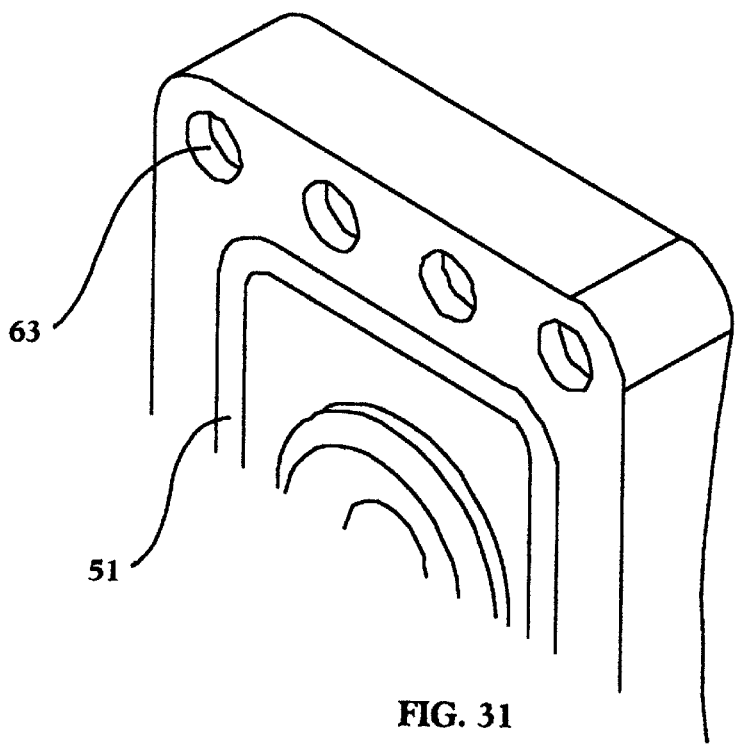

FIG. 31 is an oblique partial perspective view of the underside of the repair plate of FIG. 30. This drawing shows a back view of the "o"-ring special sealing groove to seal plate to shell.

Figure 32:
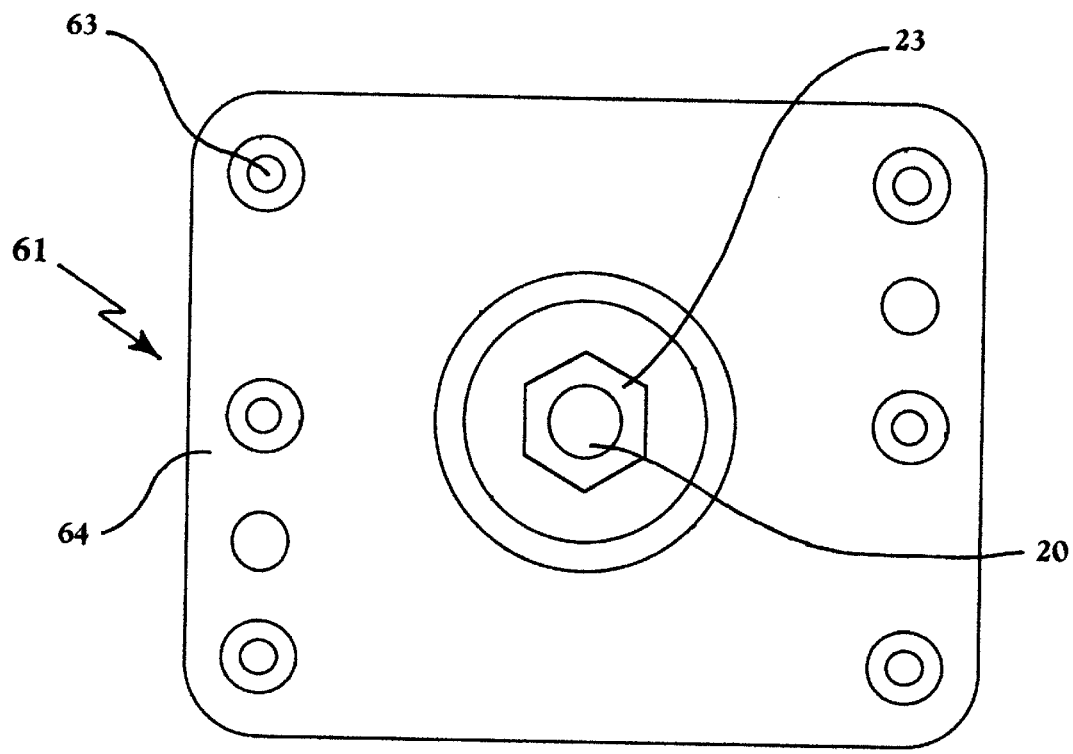

FIG. 32 is a plan view of the repair plate and repair washer assembly of the present invention, and is identified as a repair washer new S/A. This drawing also shows 2 dowell pin holes (unnumbered).

Figure 33:
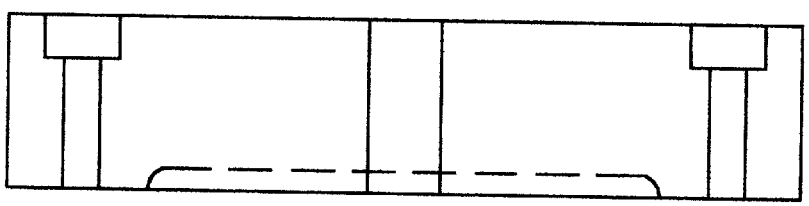

FIG. 33 is a front elevation view in partial section of the repair plate of FIG. 32. The bottom face of this plate will be concave.

Figure 34:
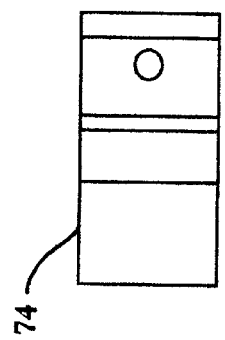

FIG. 34 is a front elevation view of a drill stopper bushing used in making the present invention.

Figure 35:
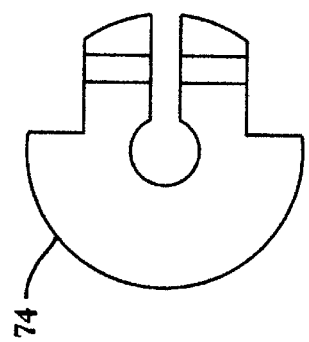

FIG. 35 is a top plan view of FIG. 34.

Figure 36:
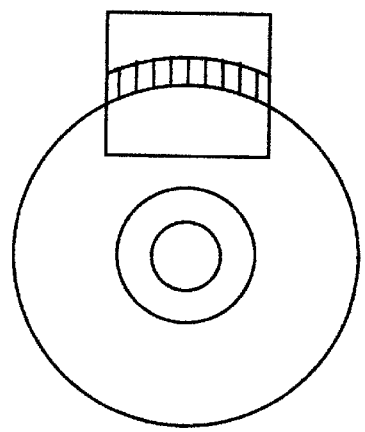

FIG. 36 is a top plan view of a center drill bushing used in making the present invention.

Figure 37:
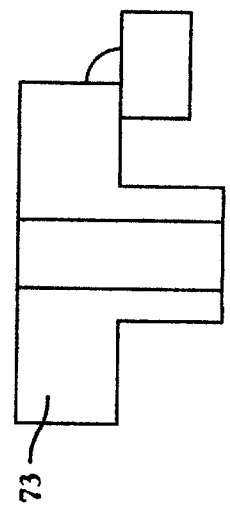

FIG. 37 is a front elevation view in partial section of the center drill bushing of FIG. 36.

Figure 38:
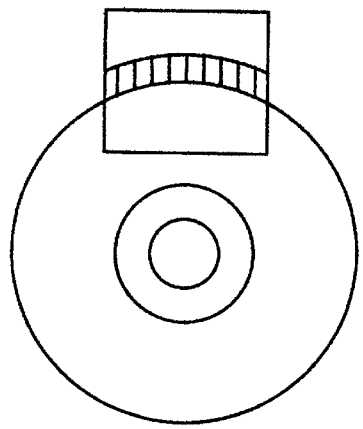

FIG. 38 is a top plan view of a tap drill bushing used in making the present invention.

Figure 39:
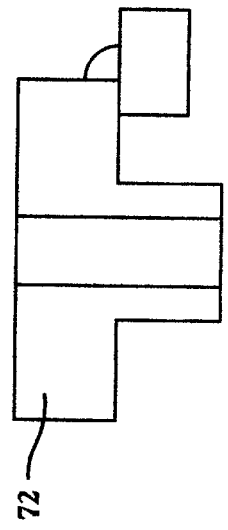

FIG. 39 is a front elevation view in partial section of the tap drill bushing of FIG. 38.

Figure 40:
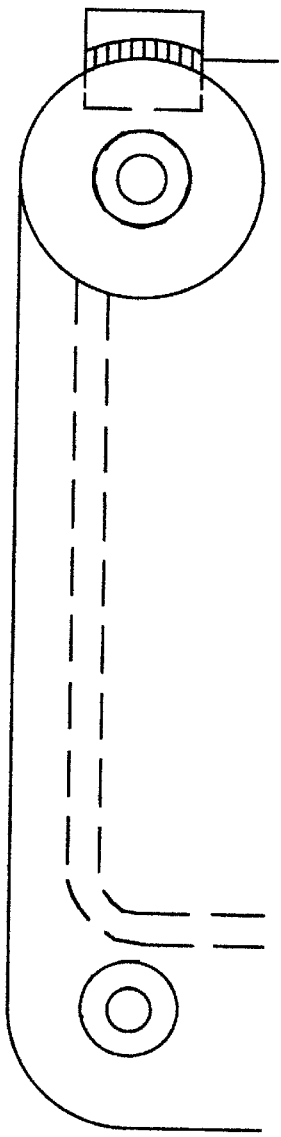

FIG. 40 is a top view in partial section of a drilling process step which is used in making the present invention. This drawing shows a tap bushing in one hole of plate 61.

Figure 41:
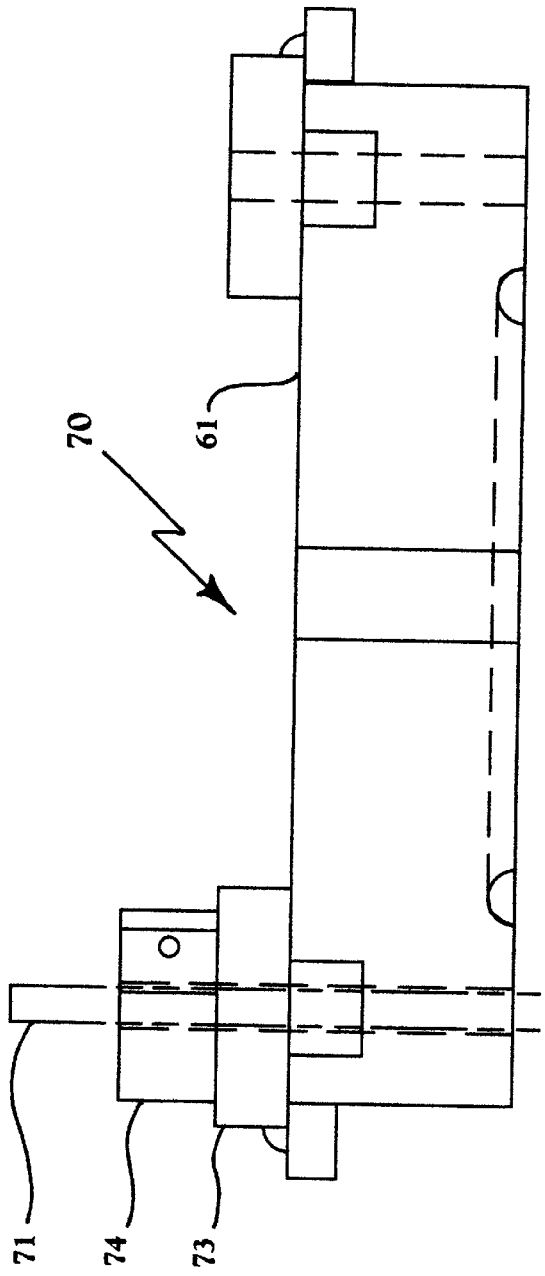

FIG. 41 is a front elevational view of a drilling process step used in making the present invention. This drawing shows the repair assembly having a certain drill 71 in a drill stopper 74 on a tap bushing 73. The bottom face of the repair assembly will be concave with radius to order.

DETAILED DESCRIPTION OF THE INVENTION

Load Spreading Bolt

As seen in FIGS. 4–9 the bolt 20 with forged head shape 30 is designed to increase contact by spreading the load area in the taper neck both radially and axially even with mismatched neck angles. This design introduces additional bolt head forged surfaces 30 with ridges 31, which project into the vacant clearance zones and touch the liner hole surfaces 12 uniformly around the faying surface of the bolt head. These projecting areas or ridges 31 are dimensioned so that they deform under load when tightened against the harder steel liner surface 12. As the bolt 20 is tightened, plastic deformation takes place resulting in additional radial and axial surface contact, until full clamp load is reached, at which time this load will be spread over a larger and more uniform surface at the neck. FIGS. 10–23 show the alternative round, elliptical, square, oblong, spherical, and rectangular neck and head shapes of the present invention.

Alternative Insert Mode

As best seen in FIGS. 24–27, using the same theory, spreader inserts 40 are used to fit between a regular standard head bolt 20 and the liner hole 12. Two inserts 40 with ridges 41 are temporarily attached, one at each neck area on the bolt, and held in place with an elastic band. Once the bolt head is assembled into the liner hole, the inserts will align themselves to spread load surface contact. Spreader inserts may be added to existing standard liner bolts, to increase their load supporting capabilities. The choice of using a forged spreader bolt (FIGS. 4–9) or spreader inserts (FIGS. 24–27) would depend on the application and customer preference.

Solution With Metal-to-Metal

Figure 3:
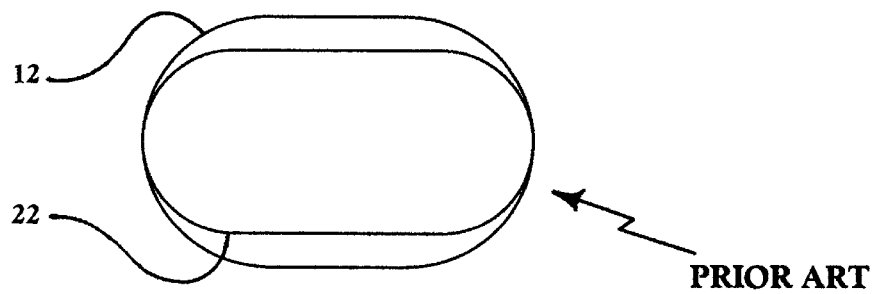
FIG. 3 is a top view in partial section taken along the lines 3—3 of FIGS. 1, 2 showing the point of contact between the oval shaped countersunk liner hole and chamfered oval shaped bolt head.
Figures 1, 2:
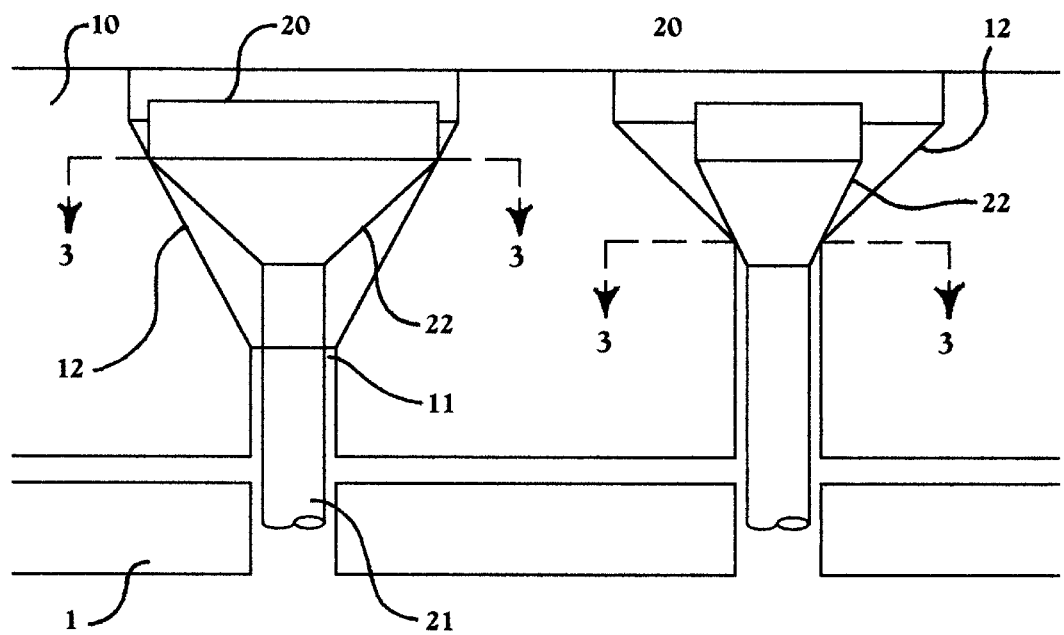
FIG. 1 is a front vertical elevation view in partial section of a prior art mill liner bolt through a liner and shell to hold the assembly together. This drawing shows radial contact with existing geometry.
FIG. 2 is a view similar to FIG. 1 showing different angles between the countersunk hole in the liner and the chamfered edge of the bolt head of the prior art. This drawing shows axial contact with mismatch of neck angles.
Figure 6:
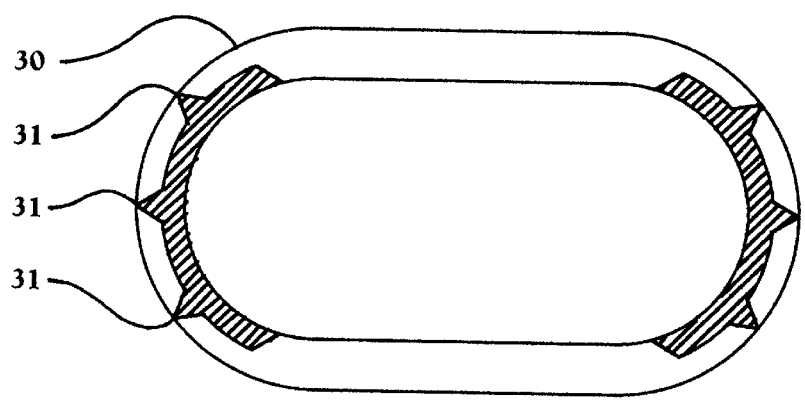
FIG. 6 is a top view in partial section taken along the lines 6—6 of FIGS. 4, 5.
Figures 4, 5:
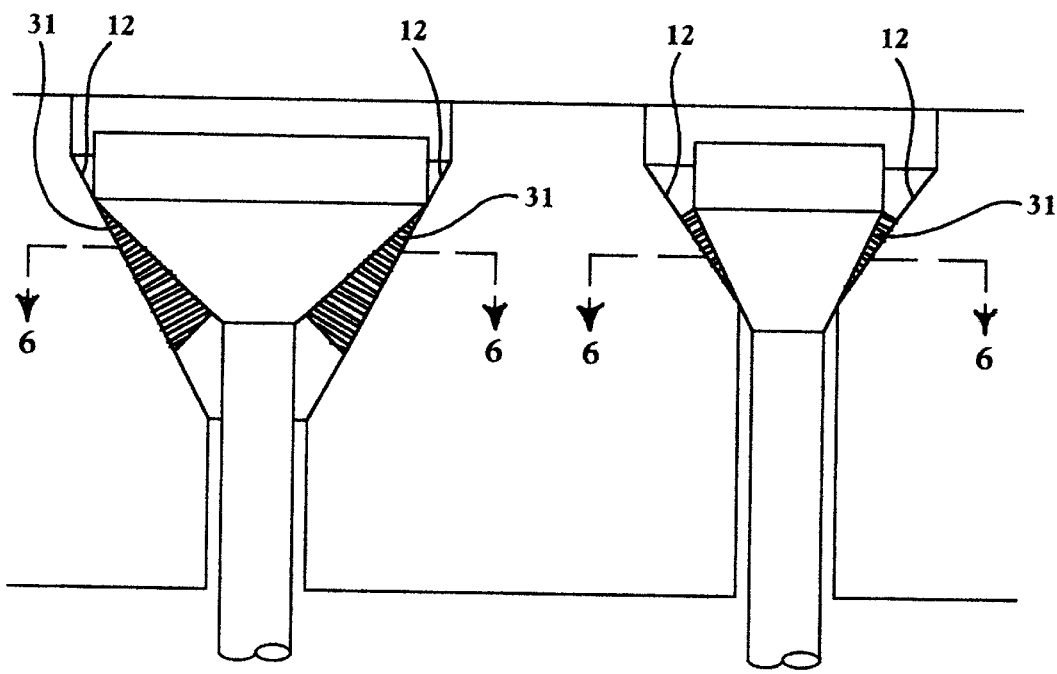
FIG. 4 is a view similar to FIG. 1 showing the forged spreader with ridges of the present invention which make good and complete contact with the countersunk hole of the liner when the bolt is preloaded to its desired amount. This drawing shows spreader correcting action both radial and axial.
FIG. 5 is a view similar to FIG. 2 again showing the forged ridged spreader of the present invention.
Figure 7:
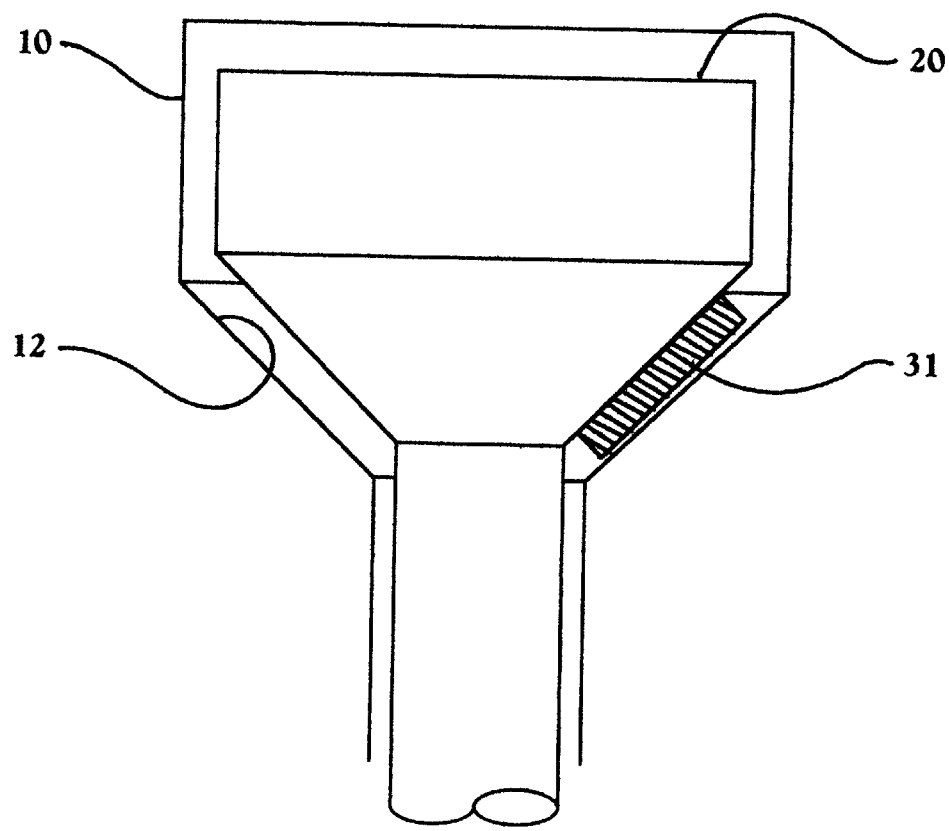
FIG. 7 is a elevational schematic view of the assembly of FIG. 4 and is identified as Liner 1.5 Shape/A.
Figure 8:
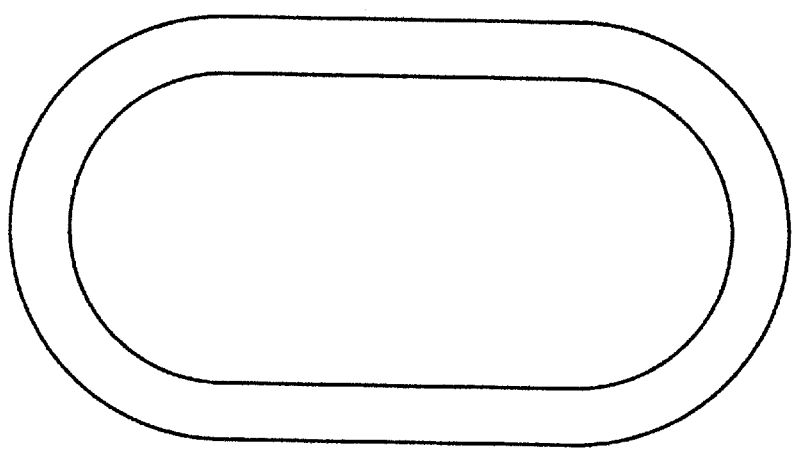
FIG. 8 is a plan schematic view of FIG. 7.
Figure 9:
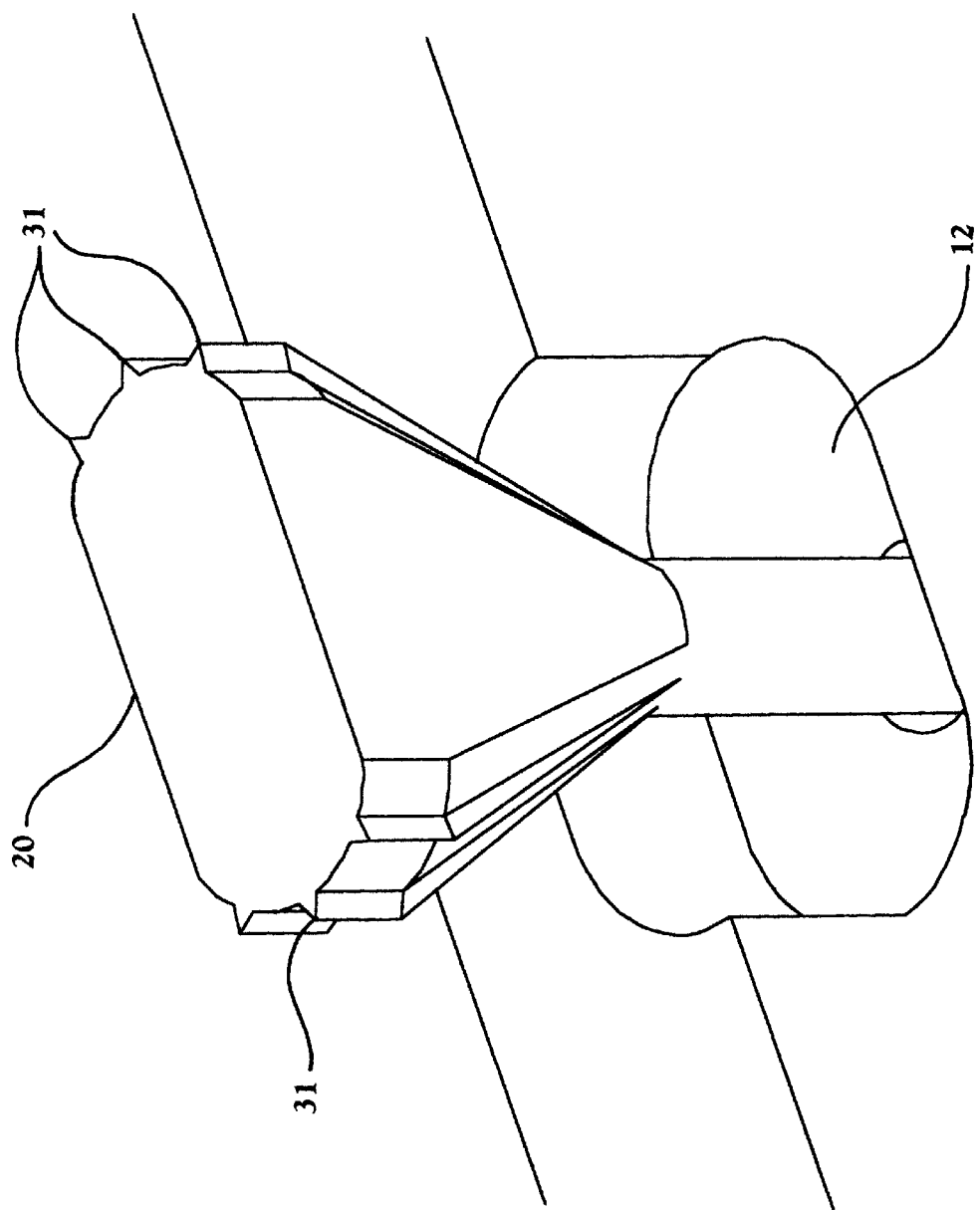
FIG. 9 is an oblique perspective of the mill bolt with forged ridged spreader of the present invention seen in FIGS. 4–8. This drawing shows a load spreader liner 20 having spreader areas 31 and a liner bolt hole 12.
Figure 11:
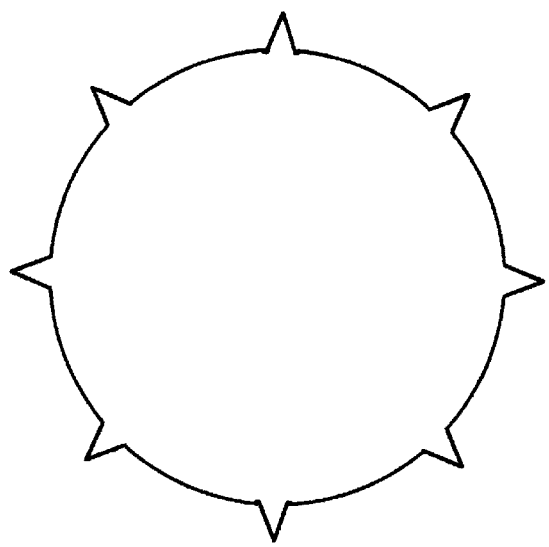
FIG. 11 is a sectional view taken along the line 11—11 of FIG. 10 showing an alternative round head and neck shape of the bolt of the present invention.
Figure 10:
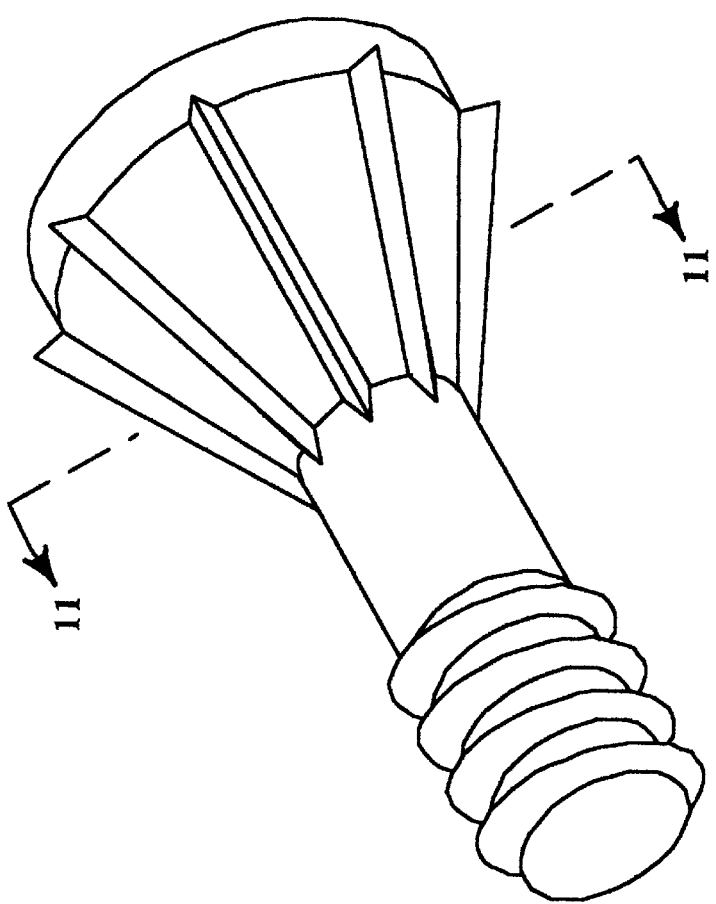
FIG. 10 is a perspective view similar to FIG. 9.
Figure 13:
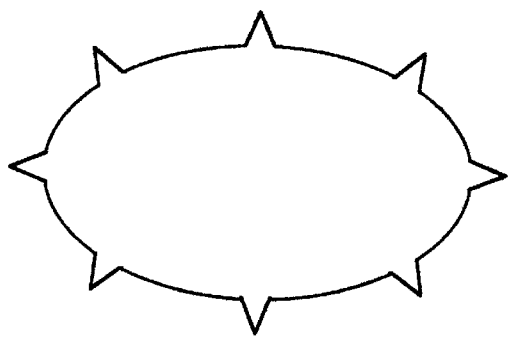
FIG. 13 is a sectional view taken along the line 13—13 of FIG. 12 showing an alternative elliptical head and neck shape of the bolt of the present invention.
Figure 12:
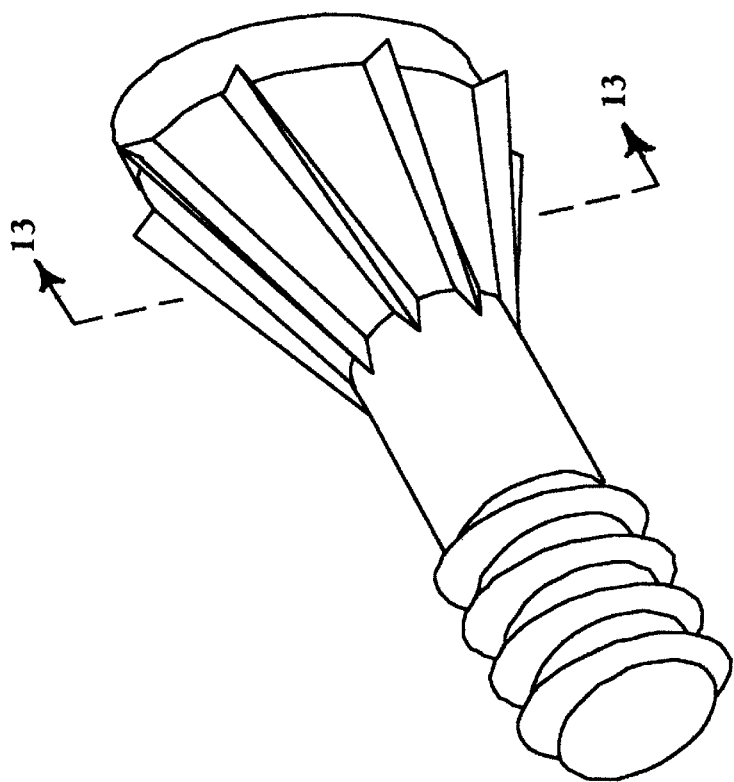
FIG. 12 is a perspective view similar to FIG. 9.
Figures 14, 15, 16:
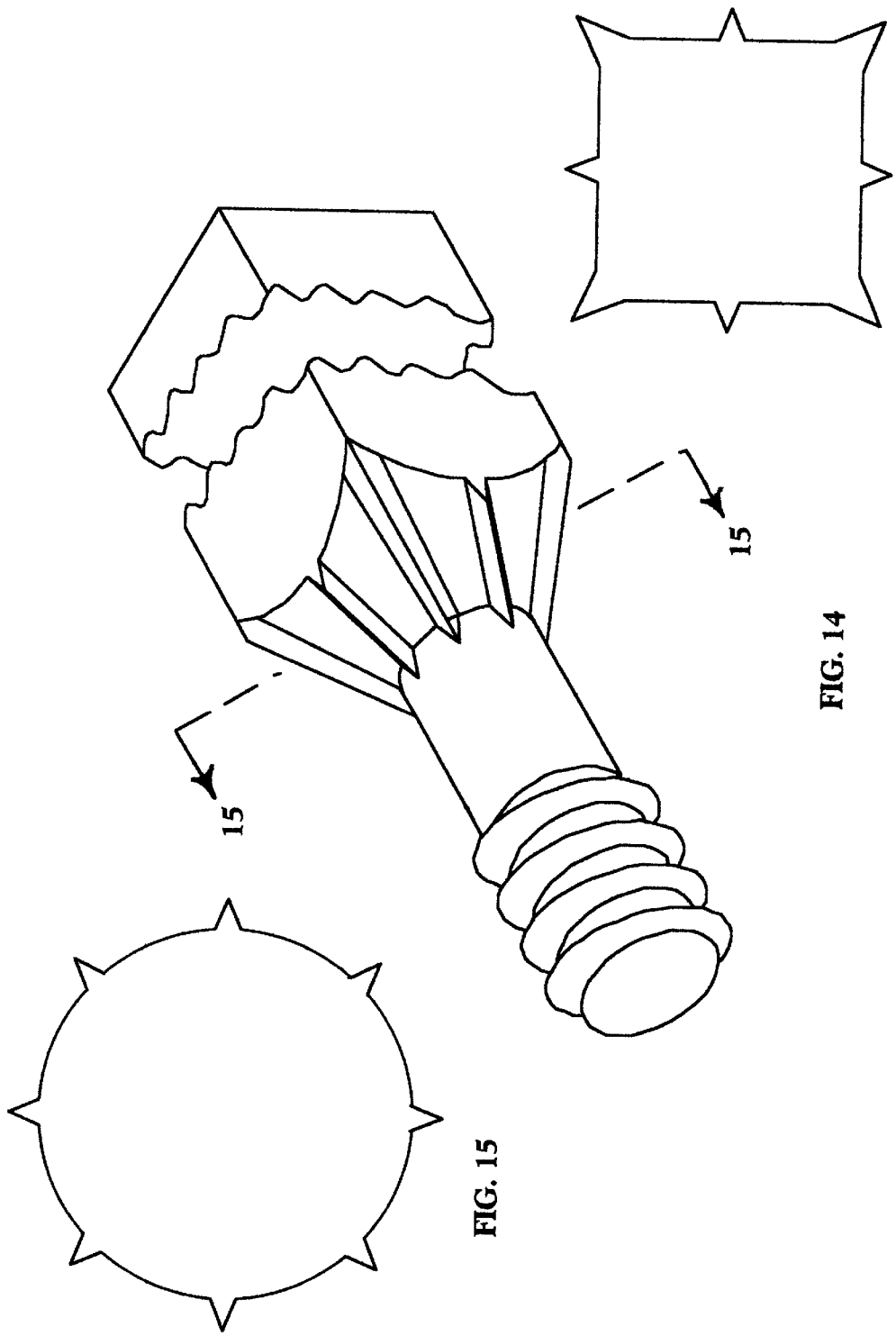
Figures 17, 18, 19:
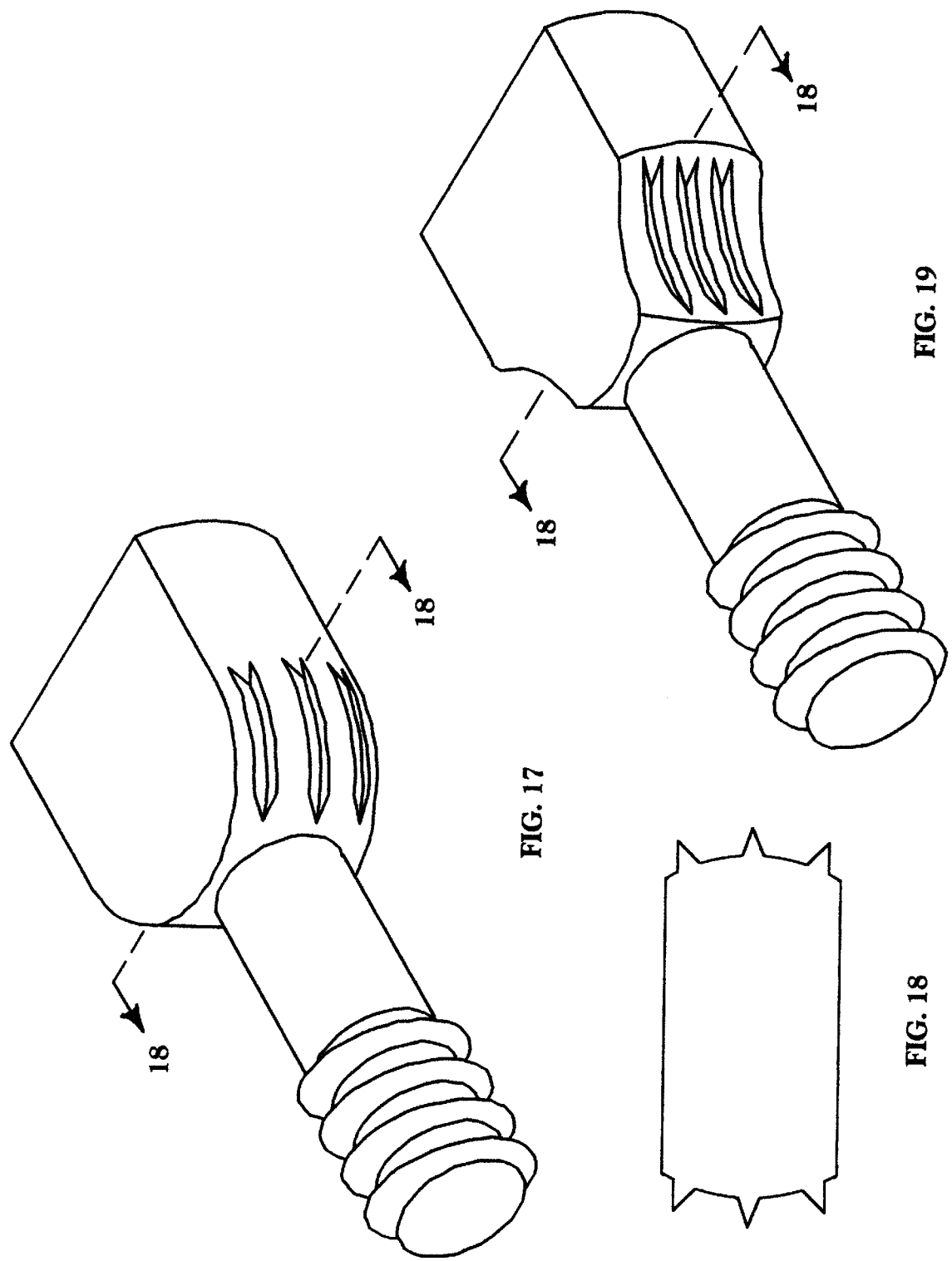
FIGS. 17 and 19 are full and partial perspective views, respectively, similar to FIG. 9
FIG. 18 is a sectional view taken along the lines 18—18 of FIGS. 17, 19 showing an alternative oblong head and convex (FIG. 17) or concave (FIG. 19) neck shape of the bolt of the present invention.
Figures 20, 21:
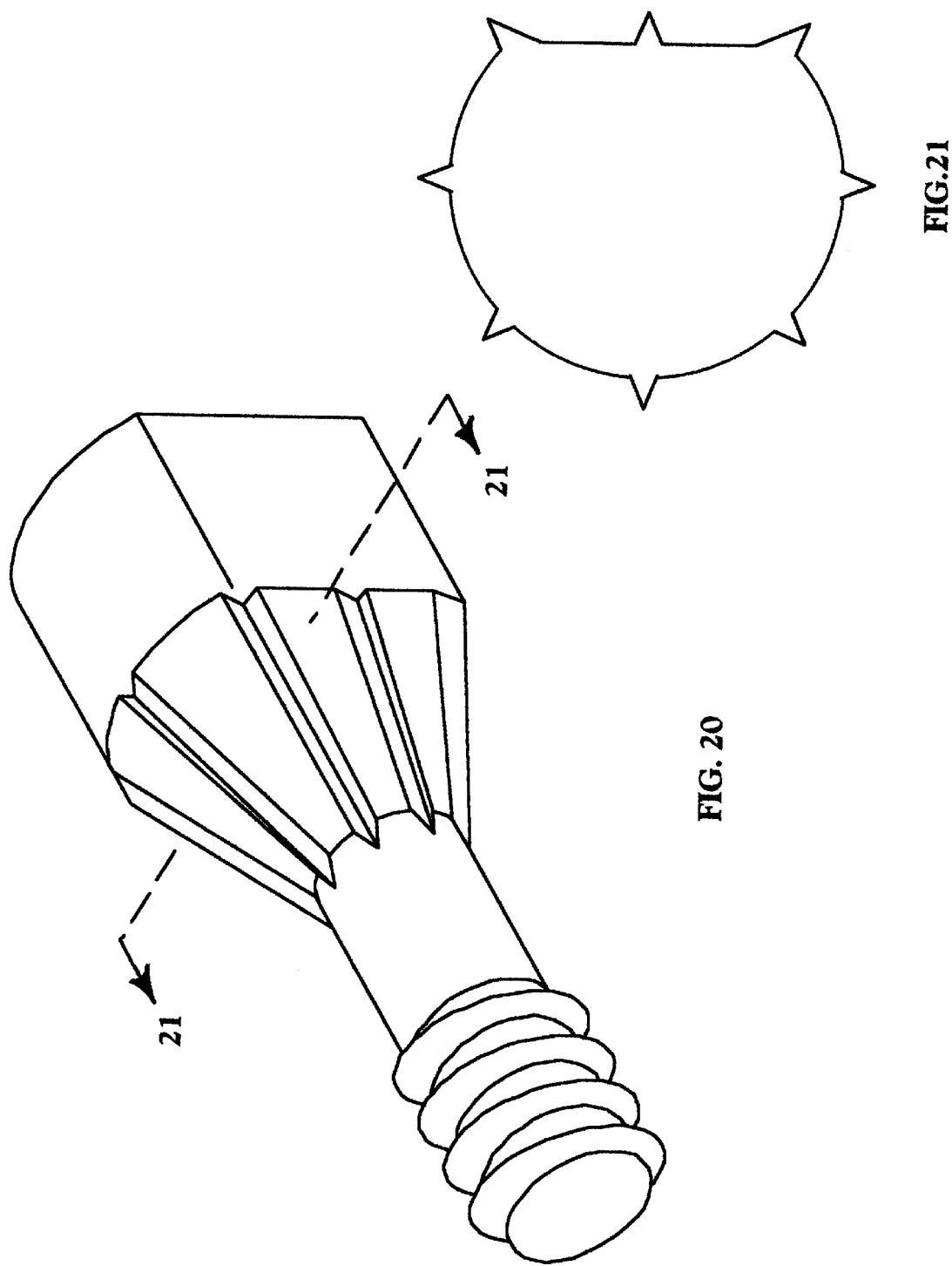
FIG. 20 is a perspective view similar to FIG. 9.
FIG. 21 is a sectional view taken along the line 21—21 of FIG. 20 showing an alternative round head with one flat face and spherical neck shape of the bolt of the present invention.
Figure 23:
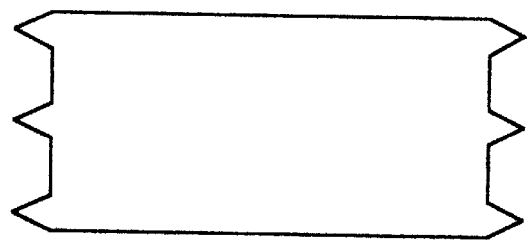
FIG. 23 is a sectional view taken along the line 23—23 of FIG. 22 showing an alternative rectangular head and neck shape of the bolt of the present invention.
Figure 22:
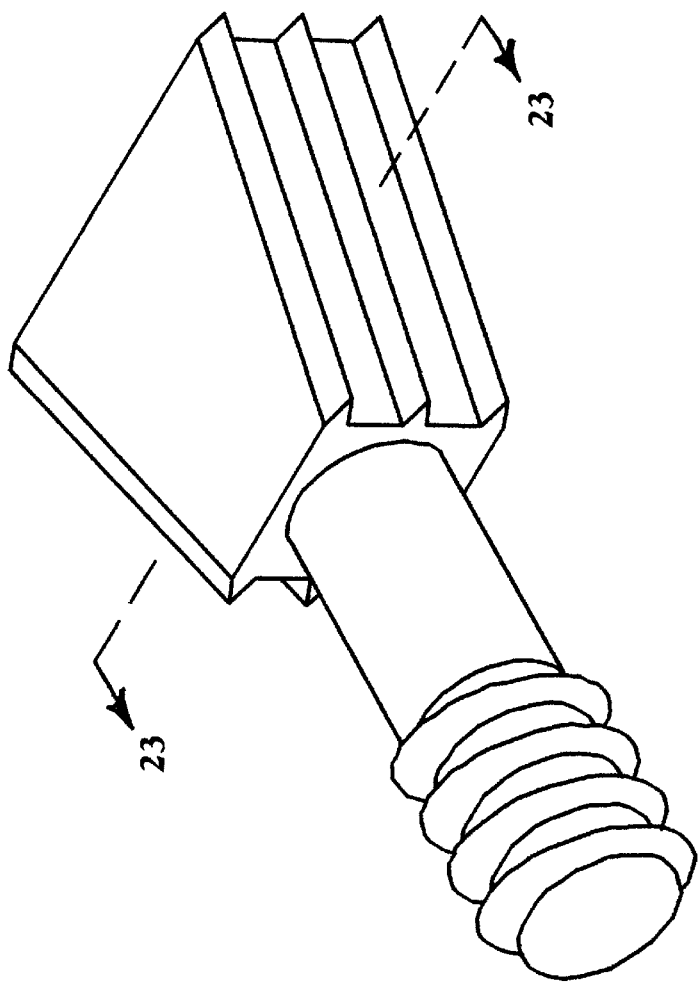
FIG. 22 is a perspective view similar to FIG. 9.
Figure 24:
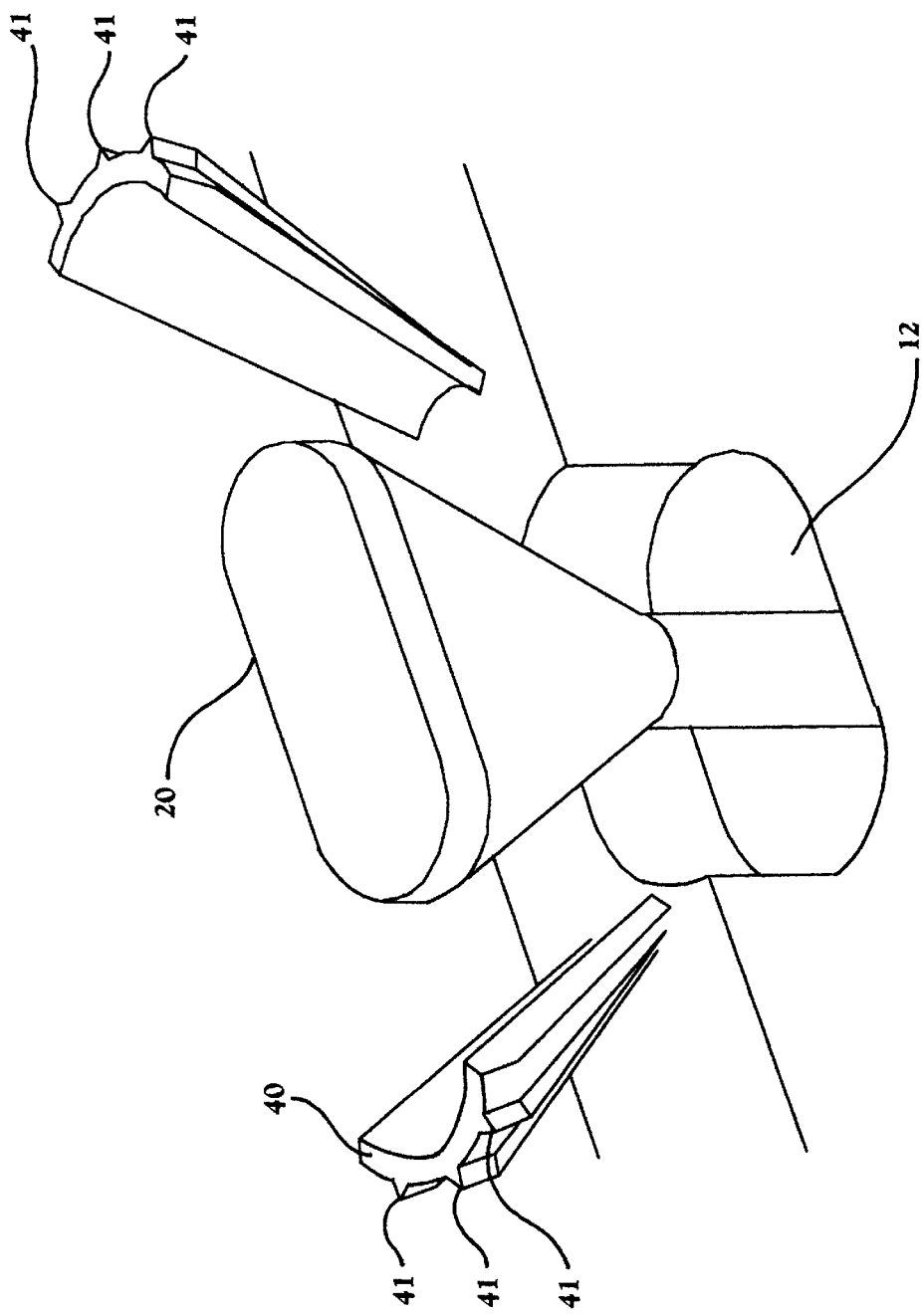
FIG. 24 is an oblique perspective view of an alternate embodiment of the present invention in the form of forged spreader inserts having deformable ridges according to the present invention. This drawing shows a standard liner bolt 20 in a liner bolt hole 2 with load spreader inserts 40 having spreader areas 41.
Figure 25:
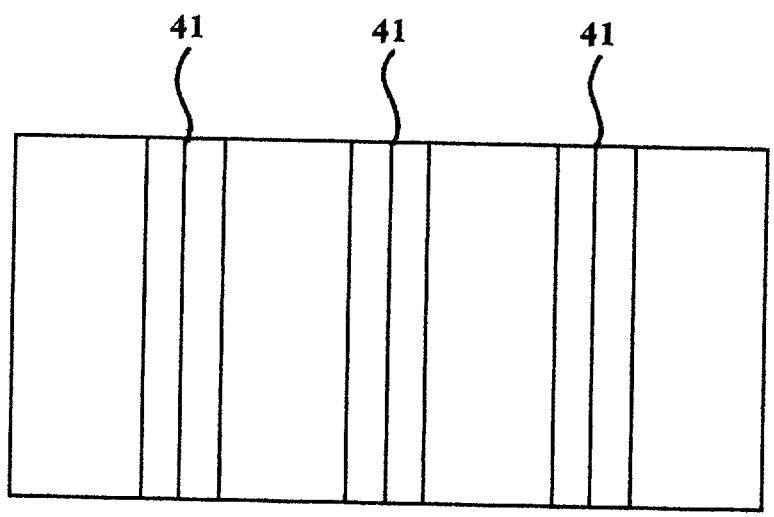
FIG. 25 is a form of the forged spreader of FIG. 10 during an early step in the manufacturing process of the present invention prior to being forged in its curved final form and is identified as Line 1.5 Shape/A.
Figure 26:
FIG. 26 is a top plan view of the forged insert of FIG. 25.
Figure 27:
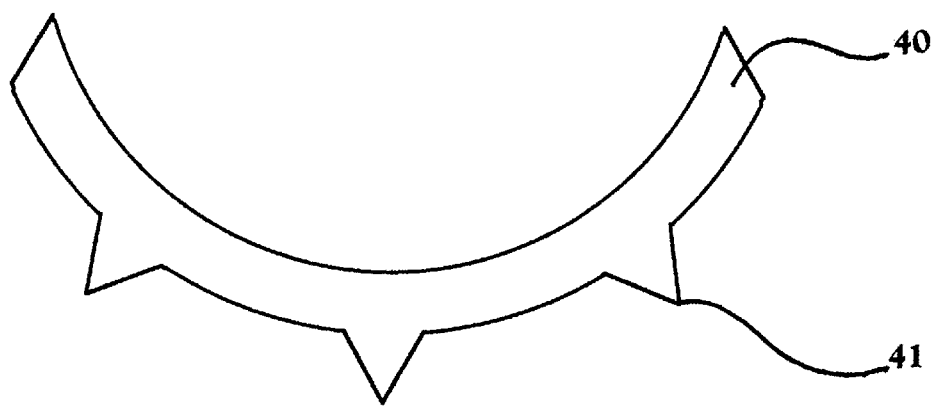
FIG. 27 is a top plan view of FIG. 26 following the forming step which forms the forged spreader into its final curved form.
Figure 28:
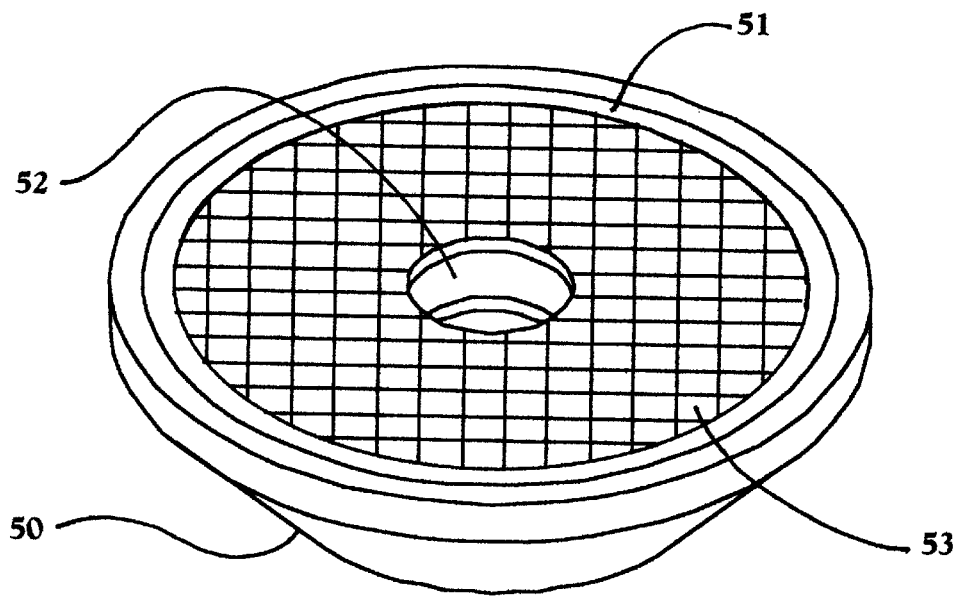
FIG. 28 is an oblique perspective view of the underside of the special repair washer of the present invention. This drawing shows a special repair washer for enlarged mill liner holes.
Figure 29:
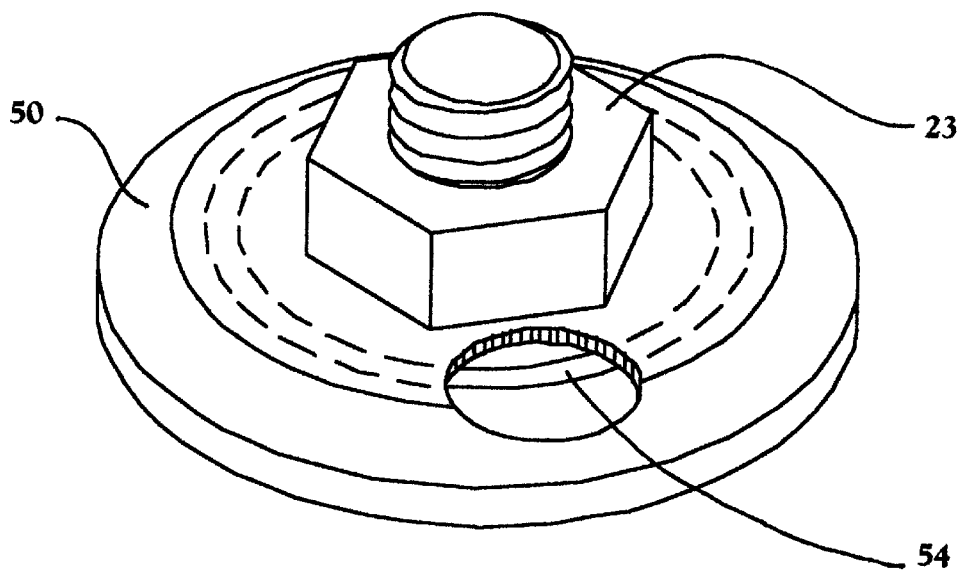
FIG. 29 is an oblique perspective top view of the special repair washer of the present invention. This drawing shows a liner bolt, nut 23, washer 50, and additional "o"-ring 54 (in phantom).

As best seen in FIGS. 28–30, the system of the present invention will allow the joint to be metal-to-metal and the seal to do its function independently. It will also apply the nut 23 load directly on the shell 1 through hardened serrated teeth 53 so that the assembly cannot move to loosen. The rubber or neoprene O-ring seal in O-ring groove 51 on the underside of repair washer 50 stays on the periphery of washer 50 away from the metal-to-metal contact area 53 where the actual load application is made. Another smaller O-ring (not shown) in annular groove 54 (FIG. 29) seals the inner hole and the threads.

Special Repair Plate and Washer to Repair Enlarged Holes in Liner Shell

As best seen in FIGS. 30–41 a further aspect of the invention includes the provision of a special repair plate and special repair washer 60 which allows repair of enlarged holes in the liner and shell caused by dynamic movement resulting from loosening of the bolt in place when prior art bolts were used. The improvement of the present invention includes a repair plate 61 having a central bore 62 (FIG. 30) and a plurality of socket holes 63. The top surface 64 of the repair plate 61 is flat, the bottom surface may be curved to match the shell Those skilled in the art would readily understand that the improved bolt of the present invention would be inserted through the hole in the liner 10 and the hole in the shell 1 through the plate 61 which is held in place by bolts (not shown) through socket holes 63, which bolts go through plate 61 and into shell 1 but not through shell 1 (to avoid causing a hole which only then would also have to be sealed). A repair washer 50 (FIG. 29) or in alternate form as shown by repair washer 60 (FIG. 30) is used to provide metal-to-metal contact and the improved sealing as described above.

The process for making repair plate 61 is demonstrated in FIGS. 32–41. After socket holes 63 are drilled, the holding bolt is removed and replaced by a bolt 20 of the present invention having forged areas 30 or alternatively using load spreader inserts 40 to which is then secured repair washer 50,60 and nut 23 as described above. A center drill 71 held in place by center drill bushing 72 allows socket holes 63 to be precisely drilled while tap drill bushing 73 coupled with drill stopper bushing 74 superimposed on top of tap drill bushing 73 as shown in FIG. 41 controls the depth to which the holes are drilled into the shell 1 but not through shell 1. When all of holes 63 are drilled, plate 61 is held in place by bolts through socket holes 63 into shell 1. First, repair plate 61 is superimposed over the central bore 11 which goes into the shell 1 and liner 10 and is held in place by a large bolt through bore 11 to prevent repair plate 61 from moving while socket holes 63 are being drilled.

The foregoing description of a preferred embodiment and best mode of the invention known to applicant at the time of filing the application has been presented for the purposes of illustration and description. It is not intended to be exhaustive or to limit the invention to the precise form disclosed, and obviously many modifications and variations are possible in the light of the above teaching. The embodiments were chosen and described in order to best explain the principles of the invention and its practical application to thereby enable others skilled in the art to best utilize the invention in various embodiments and with various modifications as are suited to the particular use contemplated.

I claim:

1. A bolt load spreading insert comprising:

a base portion having a width, a length and a thickness, the width portion being arcuate and extending 180° or less, and a plurality of surface contact portions raised above and extending along a length of the base portion, each of the raised contact surface portions forming a ridge which lies in a plane in which the load is applied to the bolt and which is deformable when the load is applied to the bolt.

2. The insert of claim 1 further comprising:

the plurality of surface contact portions and the base portion being forged integrally.

3. The insert of claim 1 further comprising:

the plurality of surface contact portions and the base portion being forged.

4. The insert of claim 1 further comprising:

the plurality of surface contact portions and the base portion being integral.

5. The insert of claim 1 further comprising:

a length of each of the raised contact surface portions being short relative to a width of the insert.

6. The insert of claim 1 further comprising:

a length of the raised contact surface portions being coterminous with a length of the base portion.

7. The insert of claim 1 further comprising:

each of the raised contact surface portions being a V-shaped ridge.

8. The insert of claim 1 further comprising:

a height of a plurality of raised surface contact portions relative to each other varies according to the amount of a clearance between the base portion and an adjacent wall portion of a bore hole in a support structure.

9. The insert of claim 1 further comprising:

a width of a plurality of raised surface contact portions relative to each other varies according to the amount of a clearance between the base portion and an adjacent wall portion of a bore hole in a support structure.

10. The insert of claim 1 further comprising:

the plurality of raised contact surface portions being parallel to each other and symmetrical relative to the base.

11. The insert of claim 1 further comprising:

the base portion having a surface portion constructed and configured to mate with opposite sides of a neck portion of a bolt while a plurality of the raised contact surface portions fay to an adjacent bore wall portion when a load is applied to the bolt.

12. The insert of claim 1 wherein the insert further comprises:

a self-aligning shape relative to a neck of a bolt when a load is applied to the bolt to spread the load onto the raised contact surfaces.

13. The insert of claim 1 wherein each raised contact surface portion extends axially and radially relative to the longitudinal axis of a bolt whereby a load applied to the bolt is spread more uniformly over a surface of the neck.

14. A bolt load spreading insert comprising:

a solid, flat base portion having a width, a length and a thickness, and a plurality of solid, deformable, surface contact portions raised above and extending along a length of the base portion.

* * * * *